(12) United States Patent
Kim et al.

(10) Patent No.: US 8,319,758 B2
(45) Date of Patent: *Nov. 27, 2012

(54) INTERFACE SYSTEM AND FLAT PANEL DISPLAY USING THE SAME

(75) Inventors: Suk-ki Kim, Suwon (KR); Sung-ha Kim, Suwon (KR); Young-kwon Jo, Suwon (KR)

(73) Assignee: Samsung Display Co., Ltd., Yongin-si (KR)

( * ) Notice: Subject to any disclaimer, the term of this patent is extended or adjusted under 35 U.S.C. 154(b) by 1308 days.

This patent is subject to a terminal disclaimer.

(21) Appl. No.: 12/040,675

(22) Filed: Feb. 29, 2008

(65) Prior Publication Data

US 2008/0253488 A1   Oct. 16, 2008

(30) Foreign Application Priority Data

Apr. 10, 2007   (KR) .......................... 10-2007-0035004

(51) Int. Cl.
*H03D 1/04* (2006.01)
*H04B 1/10* (2006.01)
*H04L 25/08* (2006.01)

(52) U.S. Cl. ........................................ 345/204; 375/346
(58) Field of Classification Search .................. 345/204; 375/346
See application file for complete search history.

(56) References Cited

U.S. PATENT DOCUMENTS

| | | | |
|---|---|---|---|
| 3,692,982 A | 9/1972 | McMillin | |
| 4,672,362 A * | 6/1987 | Furukawa et al. | 341/95 |
| 4,729,020 A | 3/1988 | Schaphorst et al. | |
| 5,173,694 A * | 12/1992 | Lynch et al. | 341/59 |
| 5,425,056 A | 6/1995 | Maroun et al. | |
| 6,313,764 B1 * | 11/2001 | Nakagawa et al. | 341/59 |
| 6,326,813 B2 * | 12/2001 | Lindsay | 326/93 |
| 6,664,905 B1 * | 12/2003 | Coene | 341/102 |
| 6,715,096 B2 * | 3/2004 | Kuge | 713/600 |
| 6,788,654 B1 * | 9/2004 | Hashimoto et al. | 370/321 |
| 6,975,546 B2 * | 12/2005 | Tsukada | 365/189.15 |
| 7,058,120 B1 * | 6/2006 | Lu et al. | 375/214 |

(Continued)

FOREIGN PATENT DOCUMENTS

KR    1994-0023073    10/1994

(Continued)

OTHER PUBLICATIONS

Korean Patent Abstracts, Publication No. 1020000003573 A, Published on Jan. 15, 2000, in the name of Seo.

(Continued)

*Primary Examiner* — Bipin Shalwala
*Assistant Examiner* — Afroza Chowdhury
(74) *Attorney, Agent, or Firm* — Christie, Parker & Hale, LLP

(57) ABSTRACT

An interface system capable of reducing or minimizing an electromagnetic interference. The interface system includes a serializing unit for receiving first data having a plurality of bits and second data having a plurality of bits, and for serially outputting the plurality of bits of the received first data and second data as 2 bits; a transmission circuit for generating 4 voltage levels in accordance with the 2 bits supplied from the serializing unit; a receiving circuit for recovering the 2 bits using the voltage levels supplied from the transmission circuit; and a deserializing unit for recovering the first data and the second data while sequentially storing the 2 bits supplied from the receiving circuit.

40 Claims, 11 Drawing Sheets

U.S. PATENT DOCUMENTS

| | | | |
|---|---|---|---|
| 7,064,690 B2* | 6/2006 | Fowler et al. | 341/101 |
| 7,272,194 B1* | 9/2007 | Mahmoud | 375/286 |
| 7,333,137 B2* | 2/2008 | Yamamoto et al. | 348/222.1 |
| 7,522,143 B2* | 4/2009 | Park et al. | 345/98 |
| 7,535,957 B2* | 5/2009 | Ozawa et al. | 375/238 |
| 7,629,956 B2* | 12/2009 | Jang et al. | 345/99 |
| 7,999,802 B2* | 8/2011 | Kim et al. | 345/204 |
| 2001/0014922 A1* | 8/2001 | Kuge | 710/36 |
| 2002/0008682 A1* | 1/2002 | Park | 345/87 |
| 2002/0130797 A1 | 9/2002 | Calvignac et al. | |
| 2003/0164811 A1 | 9/2003 | Kim et al. | |
| 2003/0184458 A1 | 10/2003 | Calvignac et al. | |
| 2004/0221201 A1 | 11/2004 | Seroff | |
| 2005/0208838 A1 | 9/2005 | Horowitz et al. | |
| 2005/0248370 A1 | 11/2005 | Li et al. | |
| 2005/0286643 A1* | 12/2005 | Ozawa et al. | 375/242 |
| 2006/0103713 A1 | 5/2006 | Hwang | |
| 2006/0125851 A1 | 6/2006 | Hwang | |
| 2006/0164370 A1* | 7/2006 | Park et al. | 345/98 |
| 2006/0227124 A1 | 10/2006 | Kim et al. | |
| 2006/0233278 A1* | 10/2006 | Zerbe et al. | 375/286 |
| 2006/0284816 A1* | 12/2006 | Jang et al. | 345/98 |
| 2007/0164883 A1 | 7/2007 | Furtner | |
| 2007/0241836 A1 | 10/2007 | Miller | |
| 2008/0211543 A1* | 9/2008 | Gruijl | 326/93 |
| 2008/0219333 A1* | 9/2008 | Kim | 375/219 |
| 2008/0252635 A1* | 10/2008 | Kim et al. | 345/214 |

FOREIGN PATENT DOCUMENTS

| | | |
|---|---|---|
| KR | 2000-0003573 | 1/2000 |
| KR | 10-2002-0056306 | 7/2002 |
| KR | 2003-0069783 | 8/2003 |
| KR | 10-2005-0000654 | 1/2005 |
| KR | 10-2006-0030680 | 4/2006 |

OTHER PUBLICATIONS

Korean patent abstracts for publication No. 1020030069783 A dated Aug. 27, 2003 in the name of Myeong Ryeol Choi, et al.

Korean patent abstracts for publication No. 1020050000654 A dated Jan. 6, 2005 in the name of Hong Sung Song, et al.

KIPO Office action dated Jun. 24, 2008 for Korean Patent application 2007-0035005, 4 pages.

U.S. Notice of Allowance dated May 18, 2011, for cross-reference U.S. Appl. No. 12/068,364, 11 pages.

* cited by examiner

INTERFACE SYSTEM AND FLAT PANEL DISPLAY USING THE SAME

CROSS-REFERENCE TO RELATED APPLICATION

This application claims priority to and the benefit of Korean Patent Application No. 10-2007-0035004, filed on Apr. 10, 2007, in the Korean Intellectual Property Office, the entire content of which is incorporated herein by reference.

BACKGROUND

1. Field of the Invention

The present invention relates to an interface system and a flat panel display using the same.

2. Discussion of Related Art

In recent years, there have been extensive developments of various flat panel displays having reduced weight and volume compared to cathode ray tubes. The flat panel displays include a liquid crystal display (LCD), a field emission display (FED), a plasma display panel (PDP), an organic light emitting display (OLED), etc.

Such flat panel displays use an interface system to transmit data from an external system to an internal data driver. The interface system is divided into a transmitting unit installed in the external system, and a receiving unit installed in a panel, etc. The transmitting unit supplies data from the external system to the receiving unit. The receiving unit transmits the data, supplied from the transmitting unit, to the data driver.

Then, the data driver generates a data signal corresponding to the data supplied to the data driver, and supplies the generated data signal to data lines.

The above-mentioned conventional interface system requires a clock having high frequency since data is typically transmitted between the transmitter and the receiver by one bit (i.e., serially in one bit streams).

SUMMARY OF THE INVENTION

A feature of exemplary embodiments of the present invention is to provide an interface system capable of reducing or minimizing an electro magnetic interference (EMI), and a flat panel display using the same.

One embodiment of the present invention provides an interface system including a serializing unit for receiving first data having a plurality of bits and second data having a plurality of bits, and serially outputting the plurality of bits of the first data and the plurality of bits of the second data as 2 bits; a transmission circuit for generating 4 voltage levels corresponding to the 2 bits supplied from the serializing unit; a receiving circuit for recovering the 2 bits using the voltage levels supplied from the transmission circuit; and a deserializing unit for recovering the first data and the second data while sequentially storing the 2 bits supplied from the receiving circuit.

The serializing unit may include a first serializer for sequentially outputting the bits of the first data; and a second serializer for sequentially outputting the bits of the second data.

The transmission circuit may include a decoder for converting the 2 bits to 3 bits; a driver for controlling a flow of electric currents in accordance with the 3 bits; and a transmission resistor for applying a voltage corresponding to the flow of electric currents supplied from the driver.

The driver may include 3 drive circuits for receiving different bits of the 3 bits and controlling the flow of electric currents in accordance with the received bits. Each of the drive circuits may include a first transistor coupled with a first voltage and for controlling a channel width so that a constant electric current flows from the first voltage; a second transistor coupled with a second voltage and for controlling a channel width so that the constant electric current flows to the second voltage; a third transistor and a fourth transistor between the first transistor and the second transistor; and a fifth transistor and a sixth transistor coupled in parallel with the third transistor and the fourth transistor.

The receiving circuit may include a receiving resistor between the transmission/receiving lines to receive a voltage applied to the transmission resistor; amplifiers for amplifying the voltage applied to the receiving resistor; comparators coupled to the amplifiers and for comparing voltages supplied from the amplifiers; and an encoder for recovering the 2 bits using bits supplied from the comparators.

The encoders may be configured to generate 2 bits of "00" when 3 bits of "000" are inputted from the comparators, to generate 2 bits of "01" when 3 bits of "001" are inputted from the comparators, to generate 2 bits of "10" when 3 bits of "011" are inputted from the comparators, and to generate 2 bits of "11" when 3 bits of "111" are inputted from the comparators.

At least one of the transmission resistor or the receiving resistor may include a main resistor between the transmission/receiving lines; a plurality of auxiliary resistors coupled in parallel with the main resistor; and switches coupled with respective said auxiliary resistors and for controlling an electrical connection of the transmission/receiving lines with the auxiliary resistors.

Another embodiment of the present invention provides a flat panel display including a timing controller for receiving data from an external system; a data driver for generating data signals using the data supplied from the timing controller and supplying the generated data signals to data lines; a scan driver for sequentially supplying a scan signal to scan lines; pixels at crossings between the scan lines and the data lines and for generating light having a luminance corresponding to the data signal; and an interface system for transmitting the data between the external system and the timing controller, wherein the interface system includes a serializing unit for receiving first data and second data and sequentially outputting bits of the first data and bits of the second data as 2 bits; a transmission circuit for generating 4 voltage levels corresponding to 2 bits supplied from the serializing unit; a receiving circuit for recovering the 2 bits using the voltage levels supplied from the transmission circuit; and a deserializing unit for recovering the first data and the second data while sequentially storing the 2 bits supplied from the receiving circuit.

The transmission circuit may include a decoder for converting the 2 bits to 3 bits; a driver for controlling a flow of electric currents in accordance with the 3 bits; and a transmission resistor for applying a voltage corresponding to the flow of electric currents supplied from the driver.

The receiving circuit may include a receiving resistor between the transmission/receiving lines to receive a voltage applied to the transmission resistor; amplifiers for amplifying the voltage applied to the receiving resistor; comparators coupled to the amplifiers and for comparing voltages supplied from the amplifiers; and an encoder for recovering the 2 bits using bits supplied from the comparators.

At least one of the transmission resistor or the receiving resistor may include a main resistor between the transmission/receiving lines; a plurality of auxiliary resistors coupled in parallel with the main resistor; and switches coupled with respective said auxiliary resistors and controlling an electrical connection of the transmission/receiving lines with the auxiliary resistors.

BRIEF DESCRIPTION OF THE DRAWINGS

These and/or other embodiments and features of the invention will become apparent and more readily appreciated from the following description of certain exemplary embodiments, taken in conjunction with the accompanying drawings of which.

DETAILED DESCRIPTION OF EXEMPLARY EMBODIMENTS

Figure 1:
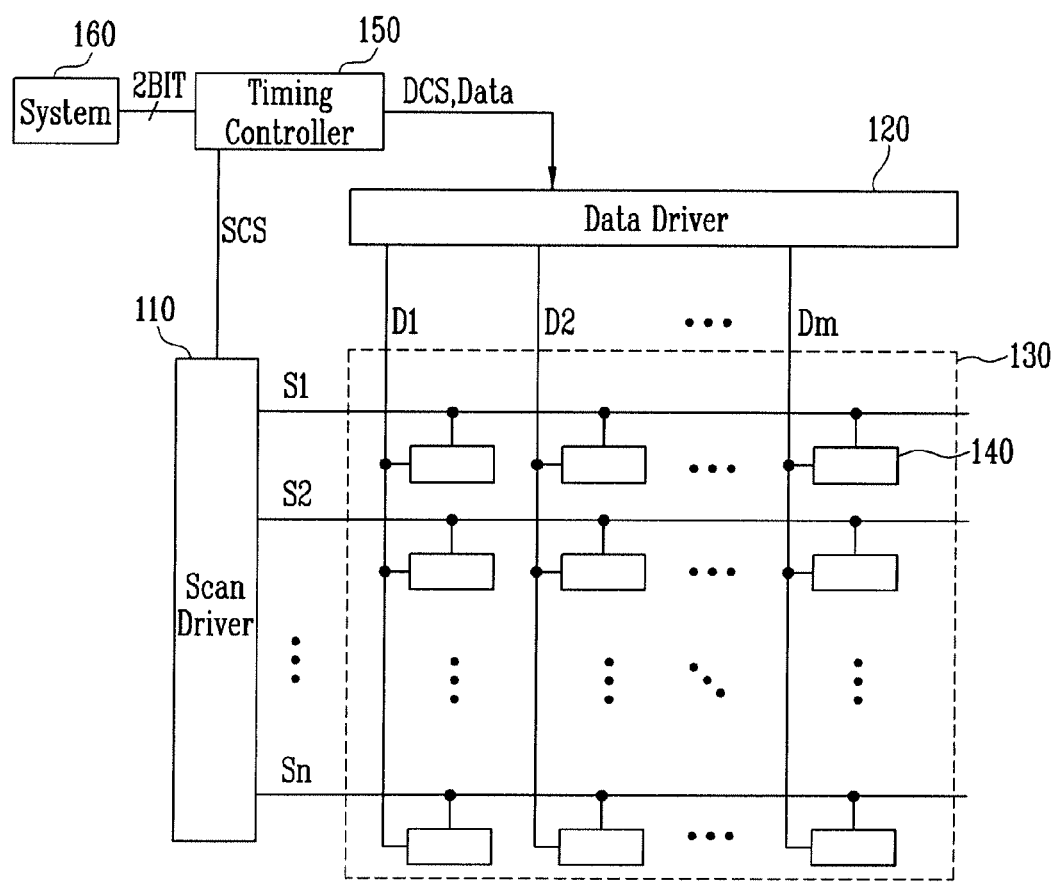
FIG. 1 is a diagram showing a flat panel display according to one exemplary embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a diagram showing a flat panel display according to an exemplary embodiment of the present invention.

Referring to FIG. 1, the flat panel display according to an exemplary embodiment includes a display unit 130 including pixels 140 arranged at crossings between scan lines (S1 to Sn) and data lines (D1 to Dm); a scan driver 110 for driving the scan lines (S1 to Sn); a data driver 120 for driving the data lines (D1 to Dm); a timing controller 150 for controlling the scan driver 110 and the data driver 120; and a system 160 for supplying data (Data) to the timing controller 150.

The scan driver 110 receives a scan drive control signal (SCS) from the timing controller 150. The scan driver 110 receiving a scan drive control signal (SCS) generates a scan signal and sequentially supplies the generated scan signal to scan lines (S1 to Sn).

The data driver 120 receives a data drive control signal (DCS) and data (Data) from the timing controller 150. The data driver 120 receiving a data drive control signal (DCS) generates a data signal and supplies the generated data signal to the data lines (D1 to Dm) to synchronize with the scan signal.

The timing controller 150 generates a data drive control signal (DCS) and a scan drive control signal (SCS). The data drive control signal (DCS) generated in the timing controller 150 is supplied to the data driver 120, and the scan drive control signal (SCS) is supplied to the scan driver 110. And, the timing controller 150 receives data (Data) from the system 160 and transmits the received data (Data) to the data driver 120.

The system 160 supplies data (Data) to the timing controller 150, the data (Data) corresponding to an image to be displayed. Generally, the data (Data) is composed of a plurality of bits. The system 160 transmits the data (Data) to the timing controller 150 in 2 bits (i.e., 2-bit parallel data). By transmitting the data (Data) in 2 bits as described above, an electromagnetic interference (EMI) may be reduced or minimized according to the described embodiment.

The display unit 130 includes pixels 140 arranged at crossings between the scan lines (S1 to Sn) and the data lines (D1 to Dm). The pixels 140 are selected when a scan signal is supplied, and then the selected pixels receive data signals. The pixels 140 receiving data signals supply light to the outside, the light having luminance corresponding to the respective data signals, and therefore a corresponding image (e.g., an image having a predetermined luminance) is displayed in the display unit 130.

Figure 2:
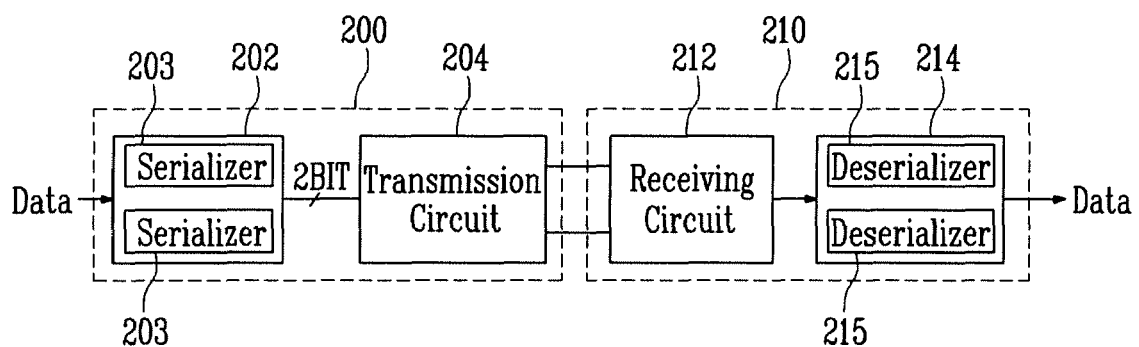
FIG. 2 is a diagram showing an interface system according to one exemplary embodiment of the present invention.

FIG. 2 is a diagram showing an interface system according to one exemplary embodiment of the present invention. A transmitting unit 200 shown in FIG. 2 is included in the system 160 of FIG. 1, and a receiving unit 210 shown in FIG. 2 is included in the timing controller 150 of FIG. 1.

Referring to FIG. 2, the interface system according to one exemplary embodiment of the present invention includes the transmitting unit 200; and the receiving unit 210 for receiving information from the transmitting unit 200 in 2 bits.

The transmitting unit 200 includes a serializing unit 202 for converting data (Data) in series, the data (Data) being supplied in parallel; and a transmission circuit 204 for transmitting the 2-bit information, supplied from the serializing unit 202, to the receiving circuit 212.

Figure 3:
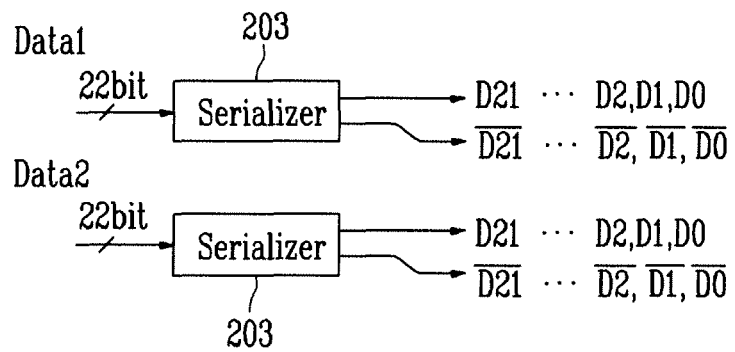
FIG. 3 is a diagram showing a serializing unit as shown in FIG. 2.

The serializing unit 202 receives two data (Data including first data (Data1) and second data (Data2)) and converts the two received data (Data) to a serial type. For this purpose, the serializing unit 202 includes two serializers 203. Each of the serializers 203 outputs different data (Data1, Data2) in series by receiving the data (Data1, Data2) and sequentially outputting bits of the received data (Data1, Data2), as shown in FIG. 3.

The transmission circuit 204 controls a direction of an electric current in accordance with the 2 bits supplied from the serializing unit 202, the electric current being supplied to a transmission resistor (not shown) included inside the transmission circuit 204. A voltage applied to the transmission resistor is determined in accordance with the 2 bits supplied from the serializing unit 202, and the voltage applied to both sides (or ends) of the transmission resistor is supplied to the receiving circuit 212. Meanwhile, the voltage applied to the transmission resistor has four voltage levels corresponding to the 2 bits.

The receiving circuit 212 recovers 2-bit information by employing the voltage applied from the transmission circuit 204, and supplies the recovered 2-bit information to the deserializing unit 214. For this purpose, the receiving circuit 212 includes a receiving resistor for receiving a voltage supplied from the transmission resistor.

Figure 4:
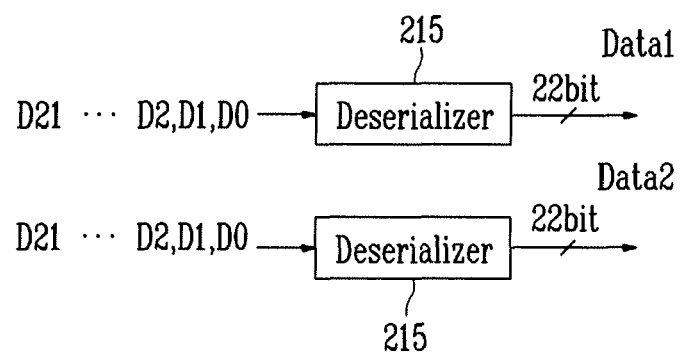
FIG. 4 is a diagram showing a deserializing unit as shown in FIG. 2.

The deserializing unit 214 recovers data (Data) by sequentially storing the bits supplied from the receiving circuit 212, and outputs the recovered data (Data) as parallel data. For this purpose, the deserializing unit 214 includes 2 deserializers 215. Each of the deserializers 215 receives 1 bit (total 2 bits) from the receiving circuit 212 and recovers data (Data1, Data2) by temporarily storing the received 1 bit, as shown in FIG. 4. And, the recovered data (Data1, Data2) is supplied to the data driver 120 as parallel data.

Figure 5:
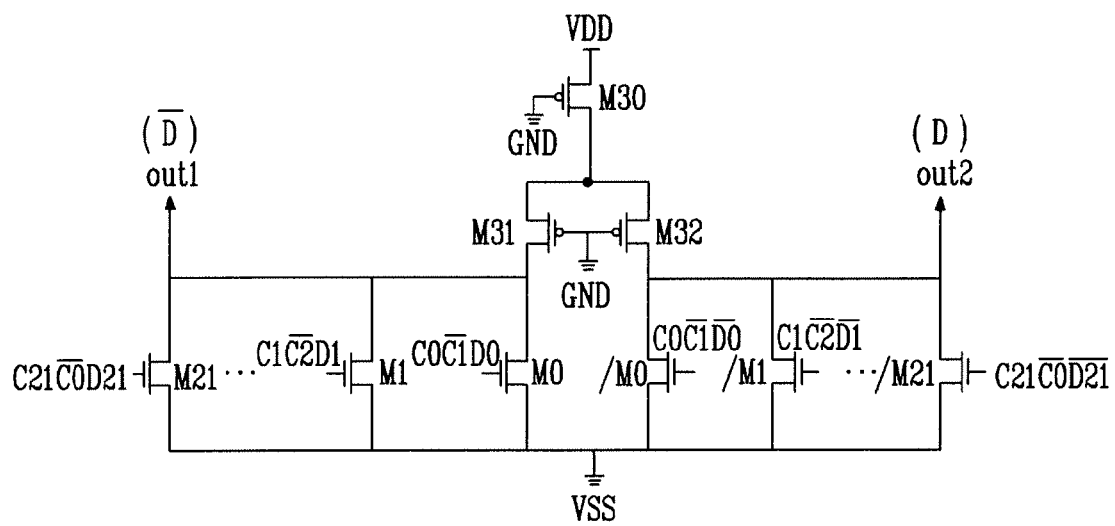
FIG. 5 is a detailed circuit diagram showing a serializer as shown in FIG. 2.

FIG. 5 is a circuit diagram showing a serializer as shown in FIG. 2.

Referring to FIG. 5, the serializer includes first transistors (M0, M1, M2, . . . , M21) for receiving different bits of the data (Data); and second transistors (/M0, /M1, /M2, . . . , /M21) for receiving inverted bits of the bits of the data (Data).

Figure 6:
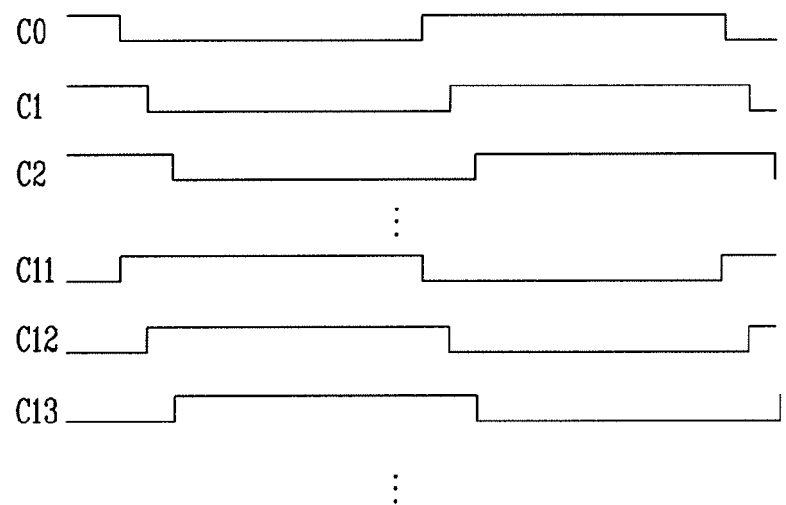
FIG. 6 is a diagram showing a driving waveform, which is supplied to transistors as shown in FIG. 5.

The first transistors (M0, M1, M2, . . . M21) are arranged between the first voltage (VDD) and the second voltage (VSS) to supply different bits of the data (Data). For example, the M0 transistor (M0) receives D0 bits of the data (Data), and the M21 transistor (M21) receives D21 bits of the data (Data). Such first transistors (M0, M1, M2, . . . , M21) are controlled to be turned on at different points in time using the control signals (C, /C). For example, the control signals (C, /C) are sequentially supplied from the M0 transistor (M0) to the M21 transistor (M21) so that the M0 transistor (M0) to the M21 transistor (M21) can be sequentially turned on. For example, the control signals (C) may be supplied to be overlapped with each other during some periods, as shown in FIG. 6. Here, turned-on and turned-off states of the first transistors (M0, M1, M2, . . . , M21) are actually determined by the bits of the data (Data) when the control signals (C, /C) are supplied. In other words, the data bits (D0 to D21) are AND'd together with respective control signals (C0 to C21) and inverted control signals (/C1 to /C21, /C0) and applied to the gates of the corresponding transistors M0 to M21.

The second transistors (/M0, /M1, /M2, . . . /M21) are arranged between the first voltage (VDD) and the second voltage (VSS) to receive different inverted bits of the data (Data). For example, the /M0 transistor (/M0) receives /D0 bits of the data (Data), and the /M21 transistor (/M21) receives /D21 bits of the data (Data). Here, the inverted bits refer to bits to which respective bits of the data are inverted. For example, a bit value of /D0 (an inverted bit of the D0) is set to "0" when a bit value of the D0 is set to "1."

Such second transistors (/M0, /M1, /M2, . . . , /M21) are controlled to be turned on at different points in time by using the control signals (C, /C). For example, the control signals (C, /C) are sequentially supplied from the /M0 transistor (/M0) to the /M21 transistor (/M21) so that the /M0 transistor (/M0) to the /M21 transistor (/M21) can be sequentially turned on. In other words, the inverted data bits (/D0 to /D21) are AND'd together with respective control signals (C0 to C21) and inverted control signals (/C1 to /C21, /C0) and applied to the gates of the corresponding transistors /M0 to /M21. This way, the first and second transistors (M0, . . . , M21, /M0, . . . , /M21) receiving inverted and non-inverted bits having the same weight in the data (Data) are set to a condition where they can be turned on at the same point in time. For example, the control signals (C, /C) are supplied to the M0 transistor (M0) and /M0 transistor (/M0) receiving the inverted bit and non-inverted bits having the same weight, so that the M0 transistor (M0) and /M0 transistor (/M0) can be turned on at the same point in time.

According to an operation process, the M0 transistor and /M0 transistor are first set to a condition where they may be turned on using the control signals (C, /C). Here, the turned-on and turned-off states of the M0 transistor and /M0 transistor are controlled using the D0 bit and /D0 bit of the data (Data). For example, if the D0 bit is set to "1", then the M0 transistor (M0) is turned on to output a value of "0" to a first output terminal (out1), and then the /M0 transistor (/M0) is turned off and a value of "1" is outputted to a second output terminal (out2). The data (Data) supplied in parallel through this process is converted to a series type, and then supplied to the first output terminal (out1) and the second output terminal (out2).

The serializer further includes an M30 transistor (M30), an M31 transistor (M31) and an M32 transistor (M32). The M31 transistor (M31) is arranged between the M30 transistor (M30) and the first transistors (M0, . . . , M21), and receives a ground power source (GND) into a gate electrode to sustain a turned-on state. The M32 transistor (M32) is arranged between the M30 transistor (M30) and the second transistors (/M0, . . . , /M21), and receives a ground power source (GND) into the gate electrode to sustain a turned-on state. The M30 transistor (M30) is arranged between a common node and a first voltage (VDD) of the M31 transistor (M31) and the M32 transistor (M32), and receives a ground power source (GND) into the gate electrode to sustain a turned-on state.

Figure 7:
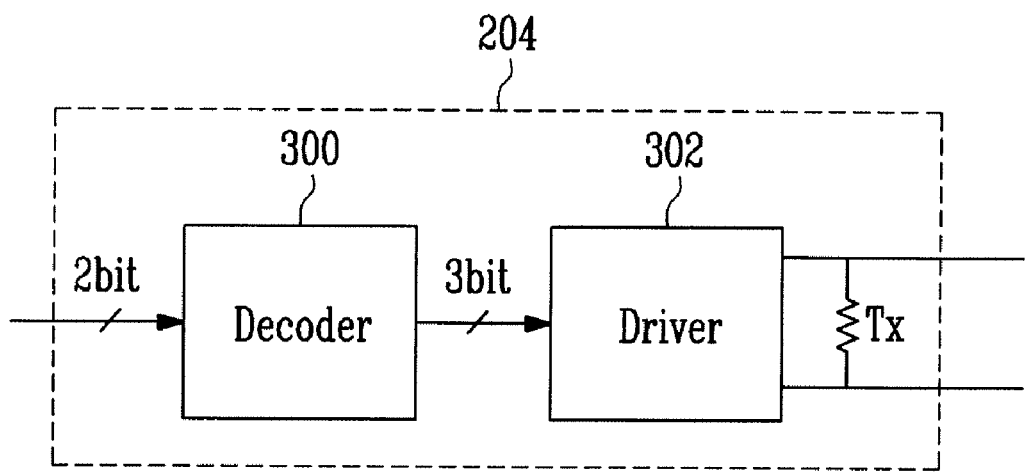
FIG. 7 is a block diagram showing a transmission circuit as shown in FIG. 2.

FIG. 7 is a block diagram showing a transmission circuit 204 as shown in FIG. 2.

Referring to FIG. 7, the transmission circuit 204 according to one exemplary embodiment of the present invention includes a decoder 300 for converting 2 bits, supplied from the serializing unit 202, to 3 bits; and a driver 302 for applying a voltage (e.g., a predetermined voltage) to a transmission resistor (Tx) in accordance with the 3 bits supplied from the decoder 300.

The decoder 300 converts 2 bits, supplied from the serializing unit 202, to 3 bits. That is to say, the decoder 300 converts 2 bits to 3 bits so that a voltage, which is divided into 4 voltage levels in the driver 302, can be generated. Actually, the decoder 300 converts 2 bits to 3 bits, as listed in the following Table 1.

TABLE 1

| 2 bits | 3 bits |
|---|---|
| 00 | 000 |
| 01 | 001 |
| 10 | 011 |
| 11 | 111 |

Referring to Table 1, the decoder 300 generates 3 bits of "000" and transmits the generated 3 bits of "000" to the driver 302 when 2 bits of "00" is inputted from the serializing unit 202, and generates 3 bits of "001" and transmits the generated 3 bits of "001" to the driver 302 when 2 bits of "01" is inputted from the serializing unit 202. Also, the decoder 300 generates 3 bits of "011" and transmits the generated 3 bits of "011" to the driver 302 when 2 bits of "10" is inputted from the serializing unit 202, and generates 3 bits of "111" and transmits the generated 3 bits of "111" to the driver 302 when 2 bits of "11" is inputted from the serializing unit 202.

The driver 302 controls a direction of an electric current supplied to the transmission resistor (Tx) so that one of the four voltage levels is applied to the transmission resistor (Tx) in accordance with a bit value of the 3 bits supplied from the decoder 300.

Figure 8:
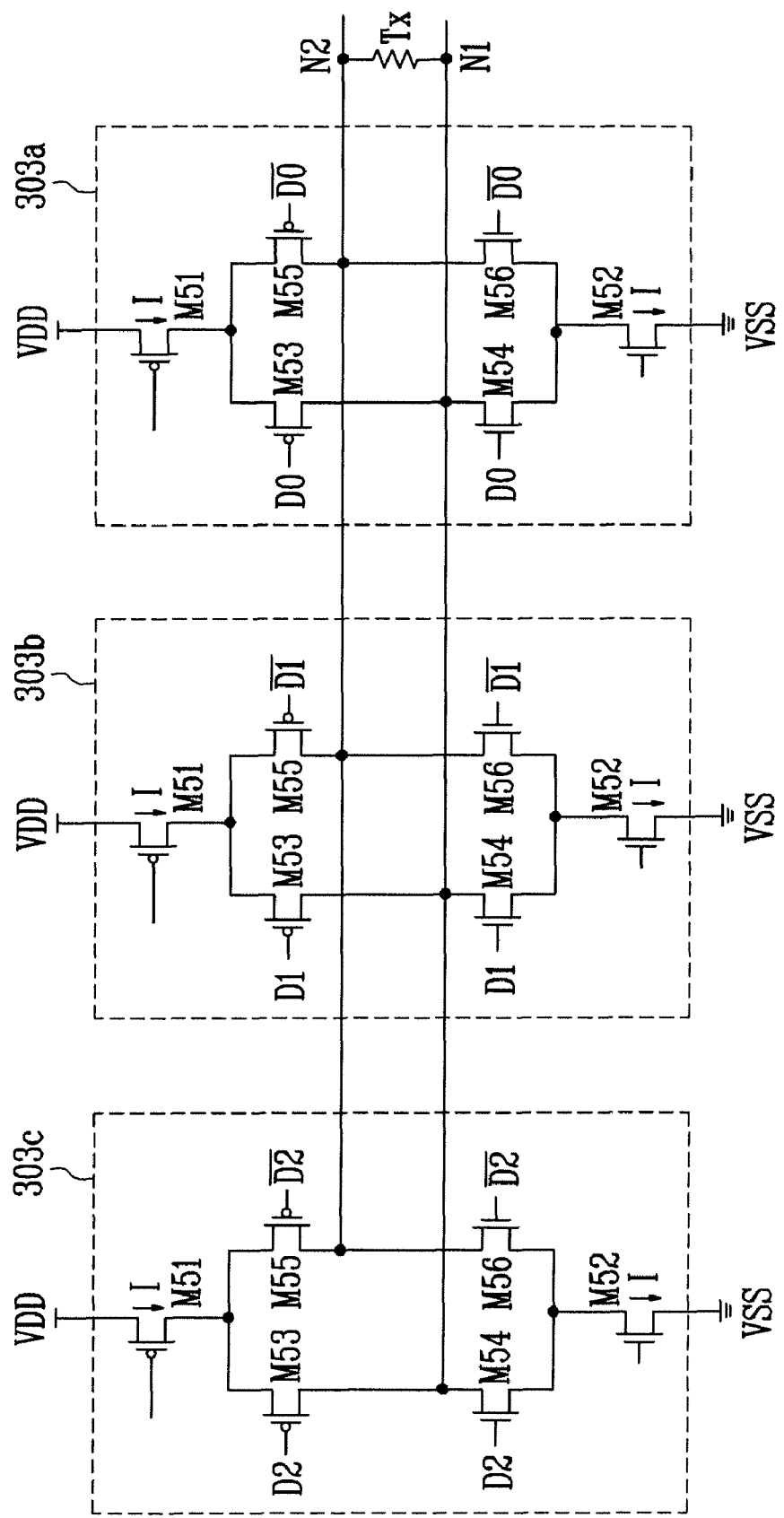
FIG. 8 is a circuit diagram showing drive circuits included in the driver as shown in FIG. 7.

FIG. 8 is a circuit diagram showing a configuration of the driver 302 as shown in FIG. 7.

Referring to FIG. 8, the driver 302 according to one exemplary embodiment of the present invention includes drive circuits 303a, 303b and 303c.

Each of the drive circuits 303a, 303b and 303c receives one bit out of the 3 bits supplied from the decoder 300, and is driven in accordance with the received bit. For this purpose, each of the drive circuits 303a, 303b and 303c includes a first transistor (M51) coupled with the first voltage (VDD) and controlling a channel width so that a constant electric current (I) can flow from the first voltage (VDD); a second transistor (M52) coupled with the second power source (VSS) (e.g., GND) and controlling a channel width so that a constant electric current (I) can flow from the second power source (VSS); a third transistor (M53) and a fourth transistor (M54) arranged in series between the first transistor (M51) and the second transistor (M52); and a fifth transistor (M55) and a sixth transistor (M56) arranged in series and coupled in parallel with the third transistor (M53) and the fourth transistor (M54).

The first transistor (M51) and the second transistor (M52) control a constant electric current (I) to flow from the first voltage (VDD) to the second power source (VSS). For this purpose, a voltage value of the first power source (VDD) is set to a higher voltage level than that of the second power source (VSS). And, the first transistor (M51) is formed as a PMOS type, and the second transistor (M52) is formed as an NMOS type.

The third transistor (M53) and the fourth transistor (M54) are turned on or turned off in accordance with certain bits (D) supplied to the third transistor (M53) and the fourth transistor (M54). Here, the third transistor (M53) is formed as a PMOS type, and the fourth transistor (M54) is formed as an NMOS type. Accordingly, the third transistor (M53) and the fourth transistor (M54) are alternately turned on and turned off.

The fifth transistor (M54) and the sixth transistor (M56) are turned on or turned off in accordance with certain inverted bits (/D) supplied to the fifth transistor (M54) and the sixth transistor (M56). Here, the fifth transistor (M55) is formed as a PMOS type, and the sixth transistor (M56) is formed as an NMOS type. Accordingly, the fifth transistor (M54) and the sixth transistor (M56) are alternately turned on and turned off.

Such an operation process of the drive circuits 303a, 303b, 303c is described in detail with reference to the following Table 2.

TABLE 2

| 3 bit | Direction of Electric Current | Voltage Applied to Transmission Resistor |
|---|---|---|
| 000 | ↑↑↑ (−6 mA) | −600 mV |
| 001 | ↑↑↓ (−2 mA) | −200 mV |
| 011 | ↑↓↓ (2 mA) | 200 mV |
| 111 | ↓↓↓ (6 mA) | 600 mV |

In Table 2, a constant electric current (I) is set to 2 mA for convenience's sake. And, a voltage applied to the transmission resistor (Tx) is set to 200 mV when the 2 mA electric current is supplied. However, the present invention is not limited thereto.

Referring to Table 2, a direction of an electric current represents a direction of an electric current that flows from the transmission resistor (Tx) in accordance with the 3 bits. And, the voltage applied to the transmission resistor represents a voltage value applied to the transmission resistor (Tx) corresponding to the flow of electric current.

When a bit of "0" is inputted to each of the drive circuits 303a, 303b and 303c, the third transistor (M53) and the sixth transistor (M56) are turned on. When the third transistor (M53) and the sixth transistor (M56) are turned on, the constant electric current (I) is supplied to the sixth transistor (M56) via the third transistor (M53), the first node (N1), the transmission resistor (Tx) and the second node (N2). That is to say, when a bit of "0" is inputted, a direction of an electric current flowing in the transmission resistor (Tx) is set to a direction from the first node (N1) to the second node (N2) (namely, the arrow "↑" as listed in Table 2).

Also, when the bit of "1" is inputted to each of the drive circuits 303a, 303b and 303c, the fourth transistor (M54) and the fifth transistor (M55) are turned on. When the fourth transistor (M54) and the fifth transistor (M55) are turned on, the constant electric current (I) is supplied to the fourth transistor (M54) via the fifth transistor (M55), the second node (N2), the transmission resistor (Tx) and the first node (N1). That is to say, when the bit of "1" is inputted, a direction of an electric current flowing in the transmission resistor (Tx) is set to a direction from the second node (N2) to the first node (N1) (namely, the arrow "↓" as listed in Table 2).

According to the operation process, when the 3 bits of "000" are inputted, each of the drive circuits 303a, 303 and, 303c supplies an electric current from the first node (N1) to the second node (N2) via the transmission resistor (Tx). Accordingly, an electric current (−6 mA) and a voltage (−600 mV) corresponding to the electric current (−6 mA) are applied to the transmission resistor (Tx), as listed in Table 2.

When the 3 bits of "001" are inputted, the second and third drive circuits 303b and 303c supply an electric current from the first node (N1) to the second node (N2) via the transmission resistor (Tx), and the first drive circuit 303a supplies an electric current from the second node (N2) to the first node (N1) via the transmission resistor (Tx). Accordingly, an electric current (−2 mA) and a voltage (−200 mV) corresponding to the electric current (−2 mA) are applied to the transmission resistor (Tx), as listed in Table 2.

When the 3 bits of "011" are inputted, the third drive circuit 303c supplies an electric current from the first node (N1) to the second node (N2) via the transmission resistor (Tx), and the first and second drive circuits 303a, 303b supply an electric current from the second node (N2) to the first node (N1) via the transmission resistor (Tx). Accordingly, an electric current (2 mA) and a voltage (200 mV) corresponding to the electric current (2 mA) are applied to the transmission resistor (Tx), as listed in Table 2.

When the 3 bits of "111" are inputted, the drive circuits 303a, 303b and 303c supply an electric current from the second node (N2) to the first node (N1) via the transmission resistor (Tx). Accordingly, an electric current (6 mA) and a voltage (600 mV) corresponding to the electric current (6 mA) are applied to the transmission resistor (Tx), as listed in Table 2.

That is to say, the driver 302 according to one embodiment of the present invention applies 4 voltage levels to the transmission resistor (Tx) in accordance with the 3 bits supplied from the decoder 300, and transmits the voltage, applied to the transmission resistor (Tx), to the receiving circuit 212. Here, a voltage of the transmission resistor (Tx) is transmitted by two (2) transmission/receiving lines arranged between the transmission circuit 204 and the receiving circuit 212.

Figure 9:
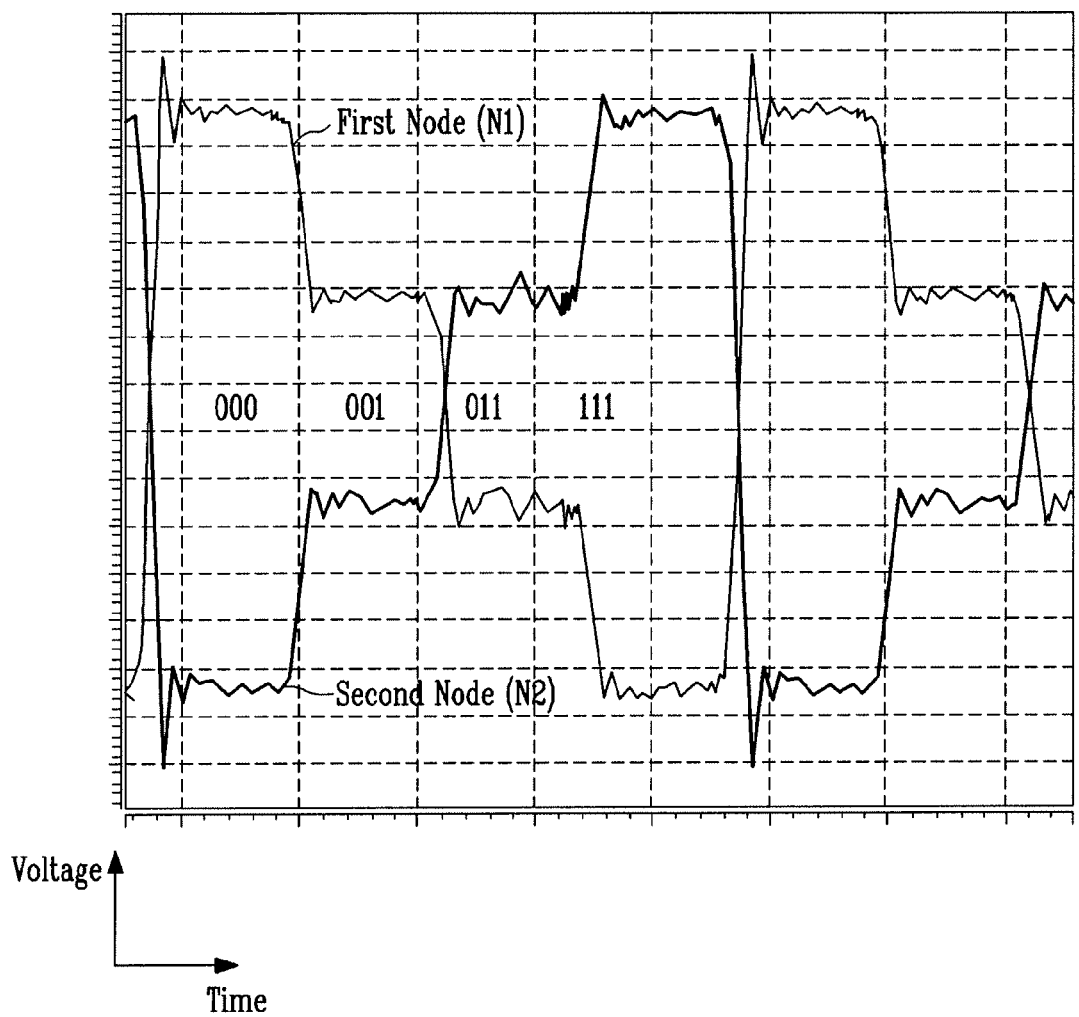
FIG. 9 is a simulation waveform diagram showing a voltage applied to a transmission resistor as shown in FIG. 8.

FIG. 9 is a simulation diagram showing a voltage, which is applied to the first node and the second node corresponding to a direction of an electric current.

Referring to FIG. 9, the voltage applied to the first node (N1) and the second node (N2) of the transmission resistor (Tx) is set to the 4 voltage levels in accordance with the 3 bits supplied from the decoder 300. Here, 2-bit information of the data (Data) is included in voltage information applied to the transmission resistor (Tx) since the 3 bits supplied from the decoder 300 are generated by the 2-bit information of the data (Data).

Figure 10:
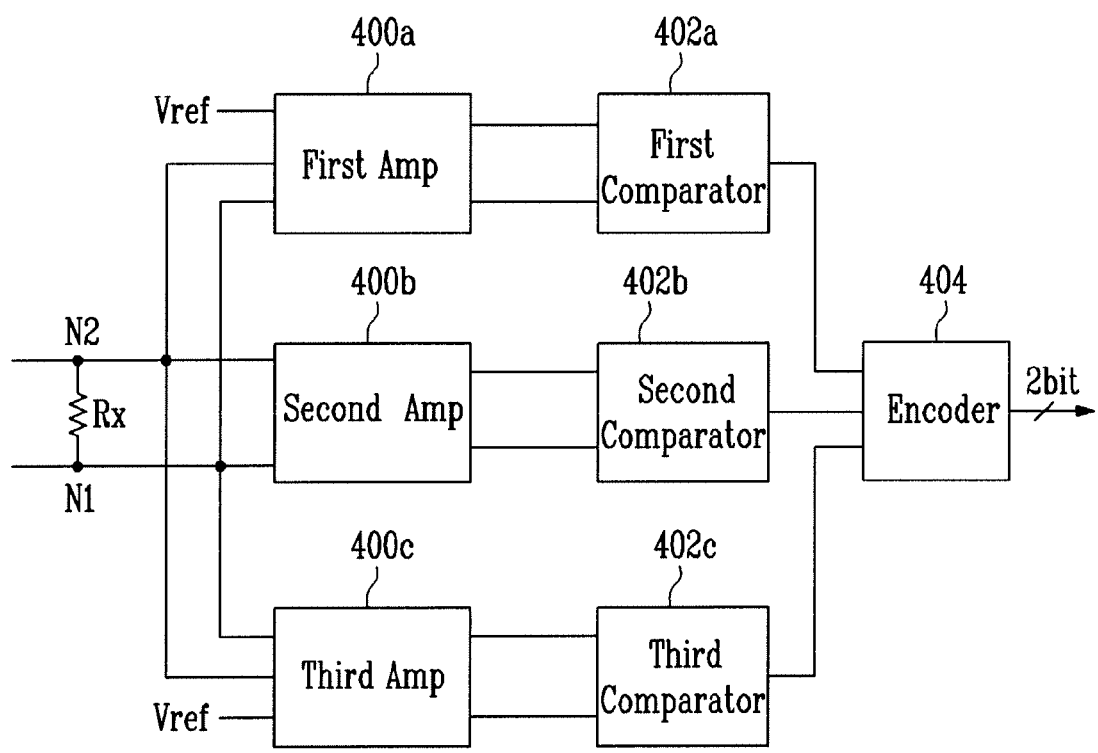
FIG. 10 is a block diagram showing a receiving circuit as shown in FIG. 2.

FIG. 10 is a diagram showing a receiving circuit 212 as shown in FIG. 2.

Referring to FIG. 10, the receiving circuit 212 according to one exemplary embodiment of the present invention includes a receiving resistor (Rx) coupled between the transmission/receiving lines; amplifiers 400a, 400b and 400c for amplifying a voltage applied at ends of the receiving resistor (Rx); comparators 402a, 402b and 402c coupled with the respective amplifiers 400a, 400b and 400c; and an encoder 404 for recovering 2 bits of the data (Data) using the bits supplied from the comparators 402a, 402b and 402c.

The voltage applied to the transmission resistor (Tx) is applied to the receiving resistor (Rx), as shown in FIG. 9. Such a receiving resistor (Rx) is used to match impedance with the transmission resistor (Tx).

The first amplifier 400a amplifies a voltage of the first node (N1) of the receiving resistor (Rx) to a relatively higher voltage level than the second node (N2) of the receiving resistor (Rx).

The second amplifier 400b amplifies a voltage of the first node (N1) of the receiving resistor (Rx) to substantially the same voltage level as the second node (N2) of the receiving resistor (Rx).

The third amplifier 400c amplifies a voltage of the second node (N2) of the receiving resistor (Rx) to a relatively higher voltage level than the first node (N1) of the receiving resistor (Rx).

The first comparator 402a generates a bit of "1" or "0" using the voltage supplied from the first amplifier 400a, and supplies the generated bits to the encoder 404. Here, the first comparator 402a generates a bit of "0" when the voltage of the first node (N1) among the voltages supplied from the first amplifier 400a is higher than that of the second node (N2), and the first comparator 402a generates a bit of "1" in the other case.

The second comparator 402b generates a bit of "1" or "0" using the voltage supplied from the second amplifier 400b, and supplies the generated bits to the encoder 404. Here, the second comparator 420a generates a bit of "0" when the voltage of the first node (N1) among the voltages supplied from the second amplifier 400b is higher than that of the second node (N2), and the second comparator 420a generates a bit of "1" in the other case.

The third comparator 402c generates a bit of "1" or "0" using the voltage supplied from the third amplifier 400c, and supplies the generated bits to the encoder 404. Here, the third comparator 420c generates a bit of "0" when the voltage of the first node (N1) among the voltage supplied from the third amplifier 400c is higher than that of the second node (N2), and the second comparator 420a generates a bit of "1" in the other case.

The encoder 404 generates 2 bits using the 3 bits supplied from the comparators 402a, 402b and 402c. Here, the encoder 404 converts the 3 bits to the 2 bits, as listed in Table 1. That is to say, the encoder 404 generates 2 bits of "00" when the 3 bits of "000" are inputted, and generates 2 bits of "01" when the 3 bits of "001" are inputted. And, the encoder 404 generates 2 bits of "10" when the 3 bits of "011" are inputted, and generates 2 bits of "11" when the 3 bit of "111" are inputted FIG. 11 is a simulation waveform view showing an operation process of the receiving circuit according to one embodiment of the present invention.

Figure 11:
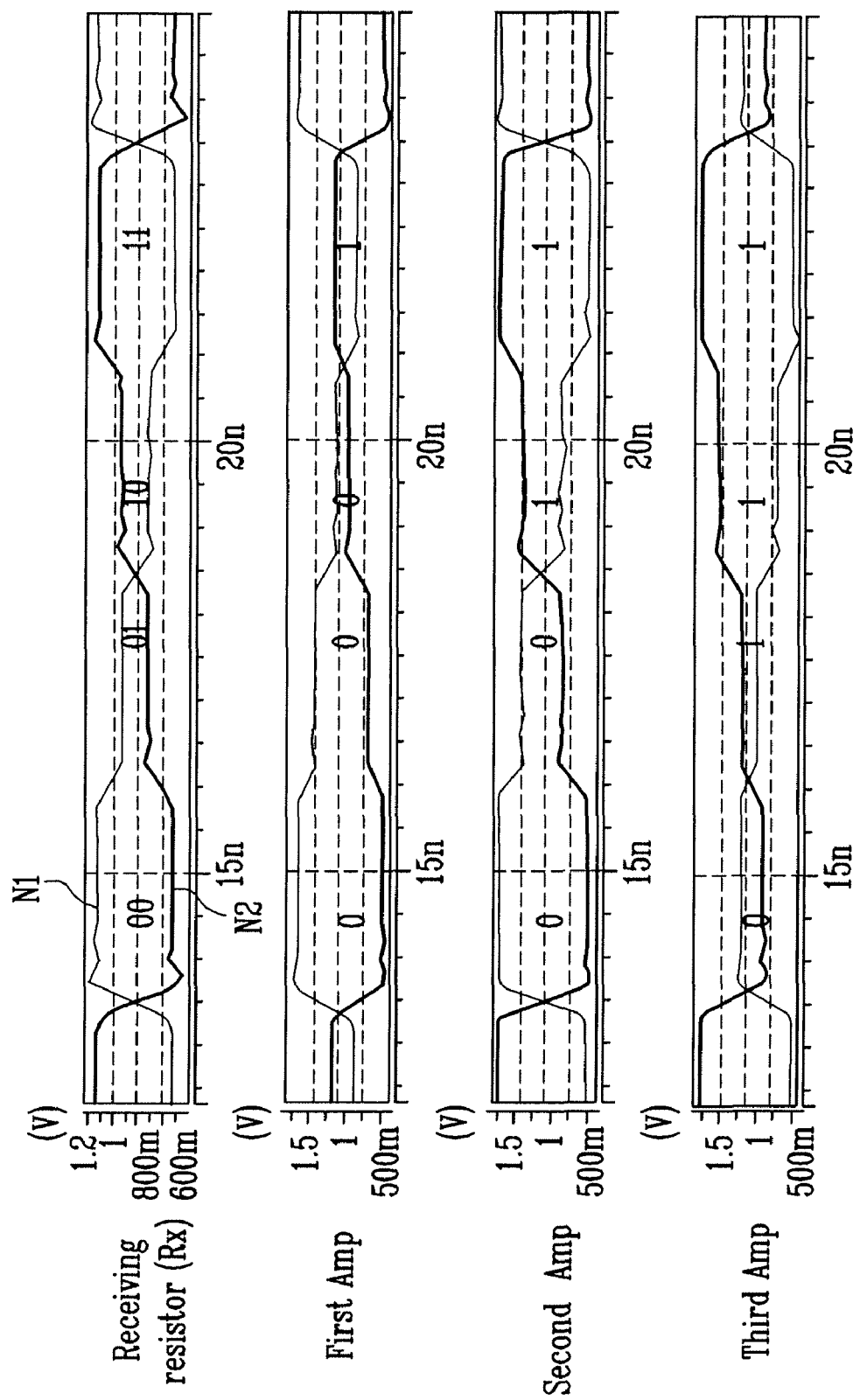
FIG. 11 is a circuit diagram showing an operation process of the receiving circuit as shown in FIG. 10.

Referring to FIG. 11, a voltage (e.g., a predetermined voltage) corresponding to the 2 bits of the data (Data) is first applied to the receiving resistor (Rx). Here, it should be assumed that voltage values corresponding to bits of "11", "10", "01" and "00" are sequentially inputted into the receiving resistor (Rx) for convenience's sake.

The amplifiers 400a, 400b and 400c amplify a voltage value supplied to the receiving resistor (Rx) and supply the amplified voltage value to the respective comparators 402a, 402b and 402c. Here, the first amplifier 400a amplifies a voltage of the first node (N1) to a relatively higher voltage level than that of the second node (N2). Actually, if a voltage corresponding to the "10" bits is applied to the receiving resistor (Rx), then the first amplifier 400a amplifies a voltage of the first node (N1) so that the voltage of the first node (N1) can have a higher voltage value than the second node (N2).

And, the third amplifier 400c amplifies a voltage of the second node (N2) to a higher voltage level than the first node (N1). Actually, if a voltage corresponding to the "01" bits is applied to the receiving resistor (Rx), the third amplifier 400c amplifies a voltage of the second node (N2) so that the voltage of the second node (N2) can have a higher voltage value than the first node (N1).

The comparators 402a, 402b and 402c generate a bit of "1" or "0" using the voltage supplied from the amplifiers 402a, 402b and 402c. Actually, the comparators 402a, 402b and 402c generate a bit of "0" when the voltage of the first node (N1) is higher than that of the second node (N2), and the comparators 402a, 402b and 402c generate a bit of "1" in the other case.

Then, when a voltage corresponding to the "11" bits is applied to the receiving resistor (Rx), bits of "111" are generated and supplied to the encoder 404, and bits of "011" are generated and supplied to the encoder 404 when a voltage corresponding to the "10" bits is applied to the receiving resistor (Rx). Also, when a voltage corresponding to the "01" bits is applied to the receiving resistor (Rx), bits of "001" are generated and supplied to the encoder 404, and bits of "000" are generated and supplied to the encoder 404 when a voltage corresponding to the "00" bits is applied to the receiving resistor (Rx).

The encoder 404 generates 2 bits in accordance with the 3 bits supplied to the encoder 404, as listed in Table 1. That is to say, the encoder 404 transmits information between the transmission circuit 204 and the receiving circuit 212 in 2 bits at once, and stably recovers the information in the encoder 404 according to one exemplary embodiment of the present invention.

Figure 12:
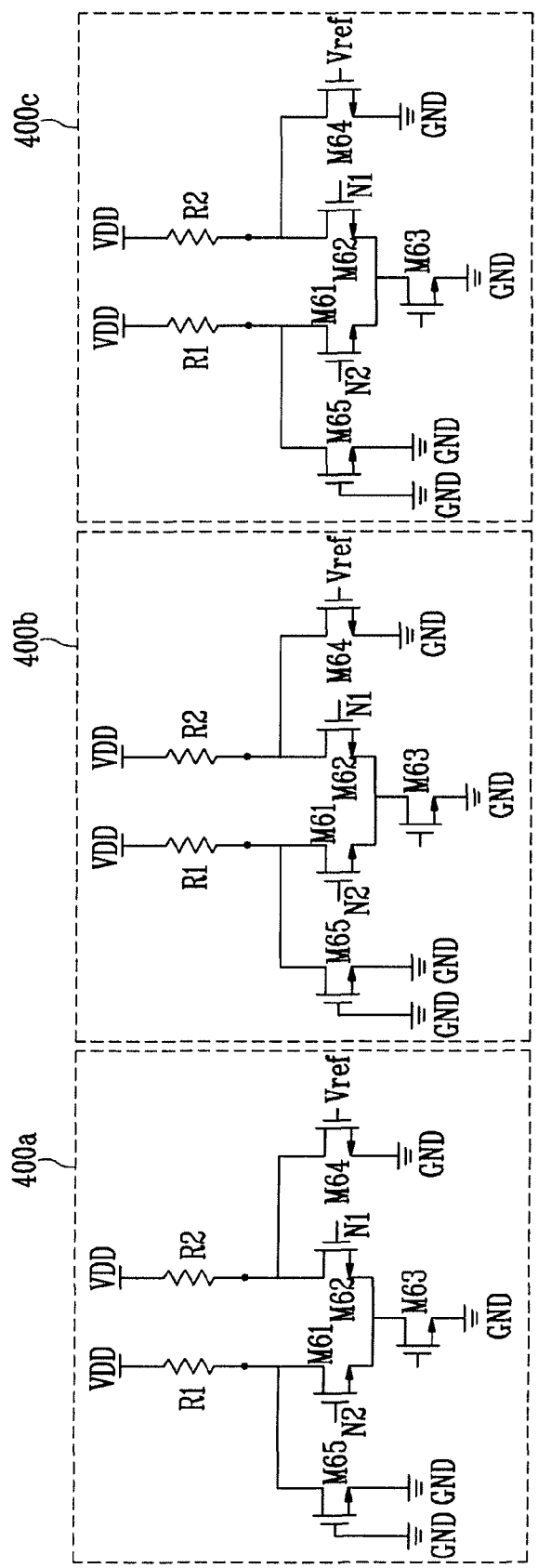
FIG. 12 is a circuit diagram showing Amps as shown in FIG. 10.

FIG. 12 is a schematic diagram showing the amplifiers 400a, 400b and 400c as shown in FIG. 10.

Referring to FIG. 12, each of the amplifiers 400a, 400b and 400c according to one exemplary embodiment of the present invention includes a first resistor (R1) and a first transistor (M61) coupled between the first voltage (VDD) and the ground power source (GND); a second resistor (R2) and a second transistor (M62) coupled in parallel with the first resistor (R1) and the first transistor (M61); and a third transistor (M63) coupled between a common node and a ground power source (GND) of the first transistor (M61) and the second transistor (M62).

A gate electrode of the first transistor (M61) receives a voltage applied to the second node (N2) of the receiving resistor (Rx). A gate electrode of the second transistor (M62) receives a voltage applied to the first node (N1) of the receiving resistor (Rx). The third transistor (M63) controls an electric current (e.g., a predetermined electric current) to flow in accordance with the voltage supplied from the outside.

The operation process will be described in detail with reference to the second amplifier 400b. First, the first transistor (M61) and the second transistor (M62) supply an electric current that flows in the third transistor (M63) using the voltage supplied to the first transistor (M61) and the second transistor (M62).

Here, each of the first transistor (M61) and the second transistor (M62) limits a channel width in accordance with the respective voltages applied to the gate electrodes of the first transistor (M61) and the second transistor (M62). In other words, the transistors M61 and M62 are driven at a resistance (e.g., a predetermined resistance). In this case, the voltage applied between the first transistor (M61) and the first resistor (R1) is outputted as the voltage of the amplified first node (N1), and the voltage applied between the second transistor (M62) and the second resistor (R2) is outputted as the voltage of the amplified second node (N2).

The first amplifier 400a, the second amplifier 400b and the third amplifier 400c further include a fifth transistor (M65) coupled between a common terminal of the first resistor (R1) and the first transistor (M61) and the ground power source (GND); and a fourth transistor (M64) coupled between a common terminal of the second resistor (R2) and the second transistor (M62) and the ground power source (GND).

The fifth transistor (M65) included in the first amplifier 400a maintains a turned-off state at all times. The fifth transistor (M65) may be omitted as a dummy transistor. The fourth transistor (M64) included in the first amplifier 400a is turned on so that an electric current (e.g., a predetermined electric current) can flow using a reference voltage (Vref) supplied from the outside. If the fourth transistor (M64) is turned on so that the electric current can flow as described above, the first amplifier 400a amplifies a voltage of the first node (N1) to a relatively higher voltage level than that of the second node (N2).

The fourth transistor (M64) included in the third amplifier 400c maintains a turned-off state at all times. The fourth transistor (M64) may be omitted as a dummy transistor. The fifth transistor (M65) included in the third amplifier 400c is turned on so that an electric current (e.g., a predetermined electric current) can flow using a reference voltage (Vref) supplied from the outside. If the fifth transistor (M65) is turned on so that the electric current can flow as described above, the third amplifier 400c amplifies a voltage of the second node (N2) to a relatively higher voltage level than that of the first node (N1).

Figure 13:
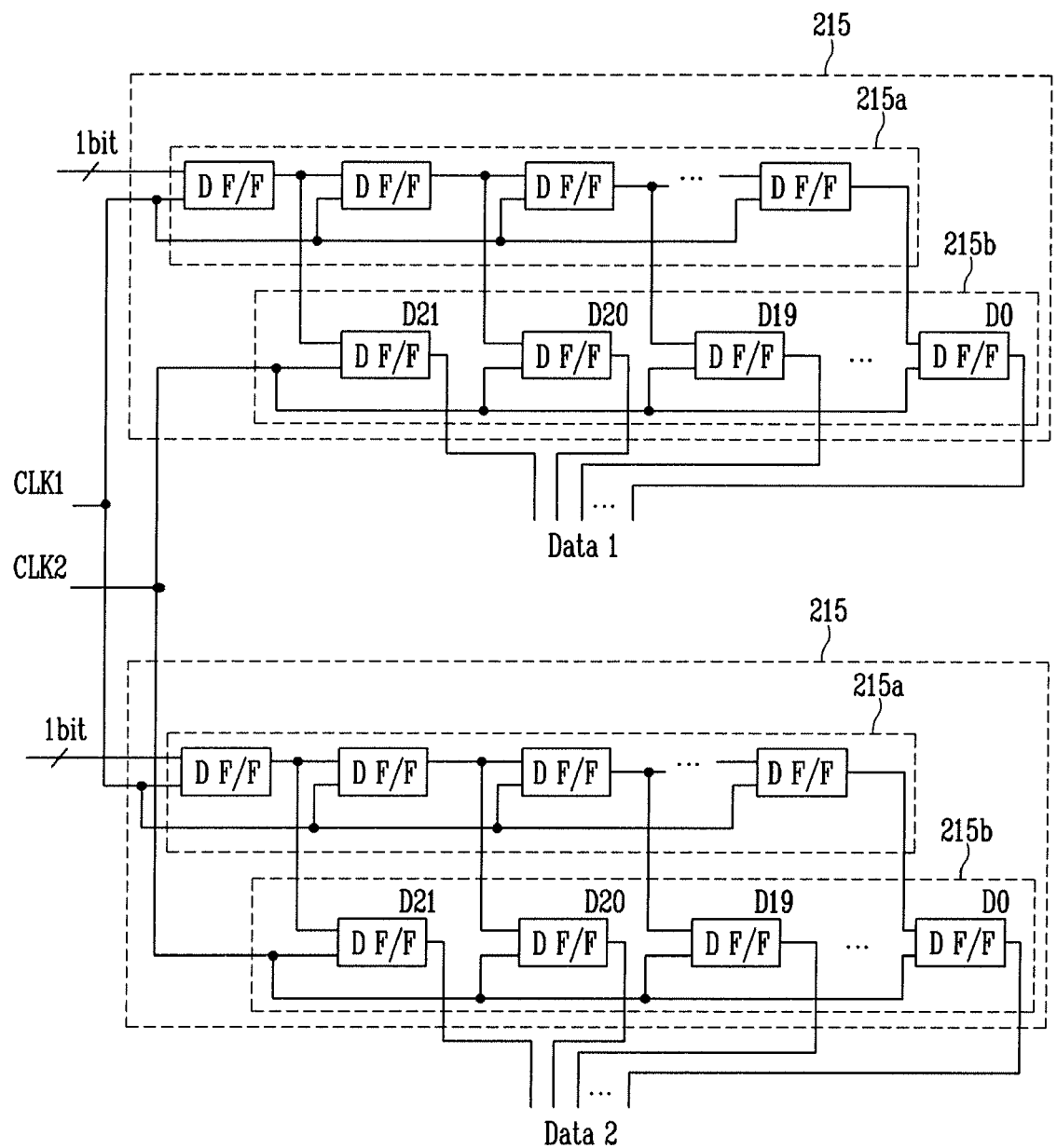
FIG. 13 is a diagram showing a deserializer as shown in FIG. 10.

FIG. 13 is a diagram showing a deserializing unit 214 as shown in FIG. 2.

Referring to FIG. 13, the deserializing unit 214 according to one embodiment of the present invention includes two (2) deserializers 215.

Each of the deserializers 215 includes first flip-flops 215a for sequentially storing 1 bit supplied from the encoder 404; and second flip-flops 215b for receiving the data stored in the first flip-flops 215a and concurrently outputting the received data.

Each of the deserializers 215 receives a different bit out of the 2 bits supplied from the encoder 404. Here, the 1 bit supplied from the encoder 404 is sequentially stored in the first flip-flops 215a. For this purpose, the first flip-flops 215a is composed of the k number of D flip-flops to correspond to k-bit data (Data) (k is an integer).

The second flip-flops 215b receive the bits stored in the first flip-flops 215a after all the bits of the data (Data) are stored in the first flip-flops 215a, and output the received bits as the data (Data) at the same time. For this purpose, the second flip-flops 215b are composed of the k number of D flip-flops. Meanwhile, the second clock signal (CLK2) supplied to the second flip-flops 215b is set to a wider width than the first clock signal (CLK1) supplied to the first flip-flops 215a.

Since the above-mentioned interface system according to one embodiment of the present invention transmits information between the transmission circuit 204 and the receiving circuit 212 in 2 bits concurrently, it may be used to lower a frequency of clocks. That is to say, a high frequency of clocks is required to transmit information in 1 bit at once, but the interface system according to the described embodiment of the present invention may lower the frequency of clocks, compared to the conventional interface system, since it transmits information in 2 bits concurrently, and therefore the interface system may reduce or minimize an electromagnetic interference (EMI).

The transmitting unit 200 may further include a phase locked loop (PLL), and the receiving unit 210 may further include a clock data recovery (CDR), according to one embodiment of the present invention. The PLL receives a reference clock (not shown), and supplies a clock to the serializing unit 202 using the received reference clock. The CDR receives a reference clock, and supplies a clock to the deserializing unit 214 using the received reference clock.

Figure 14:
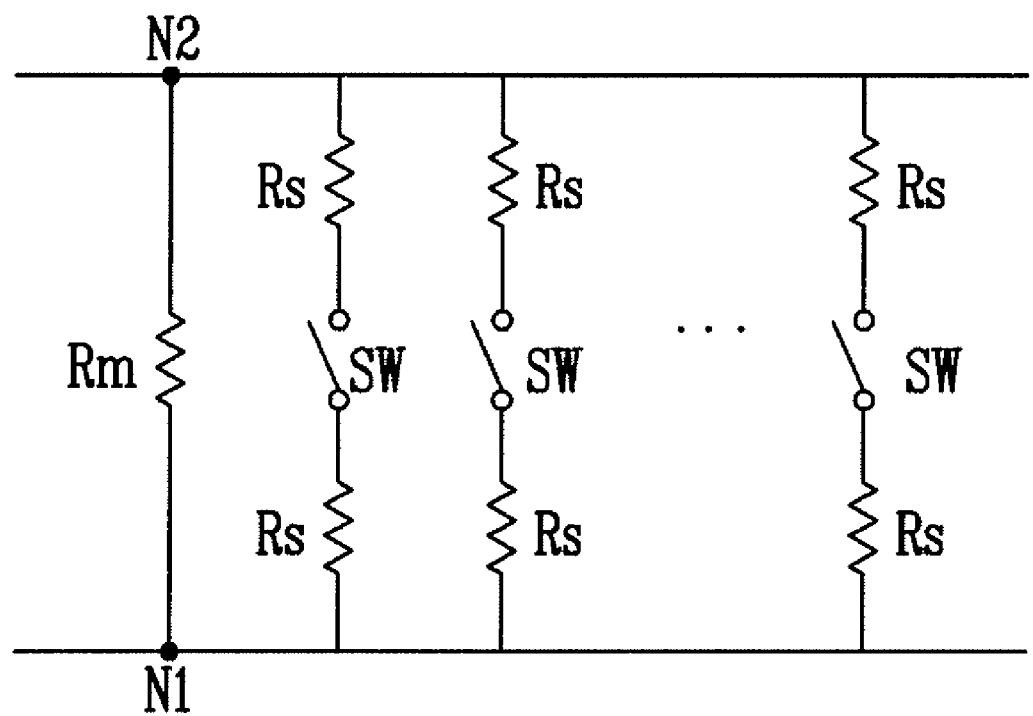
FIG. 14 is a diagram showing a resistor unit according to one exemplary embodiment of the present invention.

FIG. 14 is a diagram showing a resistor unit according to one exemplary embodiment of the present invention. The resistor unit can be used as a transmission resistor and/or a receiving resistor.

Referring to FIG. 14, the transmission resistor and/or the receiving resistor according to one exemplary embodiment of the present invention includes a main resistor (Rm) arranged between the first node (N1) and the second node (N2) of the transmission/receiving lines; auxiliary resistors (Rs) arranged between the first node (N1) and the second node (N2); and switches (SW) each coupled in series between respective auxiliary resistors (Rs) and controlling electrical connection of the transmission/receiving lines with the auxiliary resistor (Rs).

According to one embodiment of the present invention, the transmission resistor and the receiving resistor transmit information in 2 bits using the 4 voltage levels applied to the transmission resistor and the receiving resistor, as described above. Accordingly, in order to exactly transmit the information in 2 bits, the transmission resistor and the receiving resistor should be set to a resistance value having a desired design value. However, it is usually difficult to exactly design the transmission resistor and the receiving resistor with the resistance value having a desired design value due to the difference in the process.

Accordingly, a resistance value between the first node (N1) and the second node (N2) is adjusted to a desired value using the auxiliary resistors (Rs) and the switches (SW) coupled with the auxiliary resistors (Rs) according to one embodiment of the present invention. That is to say, at least one resistor out of the transmission resistor and the receiving resistor is adjusted to a desired resistance value having a desired design value by controlling a turned-on state and a turned-off state of the switches (SW).

As described above, the interface system according to the exemplary embodiment of the present invention and the flat panel display using the same may be useful to transmit information corresponding to 2 bits between the transmission circuit and the receiving circuit concurrently, the transmission circuit being arranged in the external system, and the receiving circuit being arranged in the panel. If the information corresponding to 2 bits is transmitted concurrently as described above, then a clock frequency is lowered, and therefore the electromagnetic interference (EMI) may be reduced or minimized.

Although exemplary embodiments of the present invention have been shown and described, it would be appreciated by those skilled in the art that changes might be made in these embodiments without departing from the principles and spirit of the invention, the scope of which is defined by the claims and their equivalents.

What is claimed is:

1. An interface system, comprising:
a serializing unit for receiving first data having a plurality of bits and second data having a plurality of bits, and serially outputting the plurality of bits of the first data and the plurality of bits of the second data as 2 bits;
a transmission circuit for generating four voltage levels corresponding to the 2 bits supplied from the serializing unit;
a receiving circuit for recovering the 2 bits using the voltage levels supplied from the transmission circuit; and
a deserializing unit for recovering the first data and the second data while sequentially storing the 2 bits supplied from the receiving circuit,
wherein a bit of the 2 bits comprises one of the bits of the first data, and an other bit of the 2 bits comprises one of the bits of the second data.

2. The interface system according to claim 1, wherein the serializing unit comprises:
a first serializer for sequentially outputting the bits of the first data; and
a second serializer for sequentially outputting the bits of the second data.

3. The interface system according to claim 2, wherein each of the first serializer and the second serializer comprises:
first transistors between a first voltage and a second voltage and receiving different said bits of the first data or the second data at their respective gate electrodes; and
second transistors between the first voltage and the second voltage and receiving different said bits of the first data or the second data at their respective gate electrodes.

4. The interface system according to claim 3, wherein the first transistors are configured to be turned on at different points in time in response to control signals, and an actual turned-on state of the first transistors is determined by the bits supplied to their respective gate electrodes.

5. The interface system according to claim 4, wherein the second transistors are configured to be turned on at different points in time in response to control signals, and an actual turned-on state of the second transistors is determined by the bits supplied to their respective gate electrodes.

6. The interface system according to claim 5, wherein the first transistors and the second transistors receiving the bits having a same weight and their inverted bits are configured to be turned on at a same point in time.

7. The interface system according to claim 1, wherein the transmission circuit comprises:
a decoder for converting the 2 bits to 3 bits;
a driver for controlling a flow of electric currents in accordance with the 3 bits; and
a transmission resistor for applying a voltage corresponding to the flow of electric currents supplied from the driver.

8. The interface system according to claim 7, wherein the decoder is configured to generate 3 bits of "000" when 2 bits of "00" are inputted, to generate 3 bits of "001" when 2 bits of "01" are inputted, to generate 3 bits of "011" when 2 bits of "10" are inputted, and to generate 3 bits of "111" when 2 bits of "11" are inputted.

9. The interface system according to claim 8, wherein the driver comprises 3 drive circuits for receiving different bits of the 3 bits and controlling the flow of electric currents in accordance with the received bits.

10. The interface system according to claim 9, wherein each of the drive circuits comprises:
a first transistor coupled with a first voltage and for controlling a channel width so that a constant electric current flows from the first voltage;
a second transistor coupled with a second voltage and for controlling a channel width so that the constant electric current flows to the second voltage;
a third transistor and a fourth transistor between the first transistor and the second transistor; and
a fifth transistor and a sixth transistor coupled in parallel with the third transistor and the fourth transistor.

11. The interface system according to claim 10, wherein the first voltage is higher than the second voltage.

12. The interface system according to claim 10, wherein the third transistor and the fourth transistor are turned on and turned off by certain bits of the 3 bits, and
wherein the fifth transistor and the sixth transistor are turned on and turned off by inverted bits of the certain bits.

13. The interface system according to claim 12, wherein the third transistor and the fifth transistor are PMOS transistors, and the fourth transistor and the sixth transistor are NMOS transistors.

14. The interface system according to claim 9, wherein the drive circuits are configured to control a direction of an electric current flowing in the transmission resistor between transmission/receiving lines in accordance with the 3 bits.

15. The interface system according to claim 14, wherein the receiving circuit comprises:
a receiving resistor between the transmission/receiving lines to receive a voltage applied to the transmission resistor;
amplifiers for amplifying the voltage applied to the receiving resistor;
comparators coupled to the amplifiers, the comparators for comparing voltages supplied from the amplifiers; and
an encoder for recovering the 2 bits using bits supplied from the comparators.

16. The interface system according to claim 15, wherein the amplifiers comprise:
a first amplifier for amplifying a voltage of one end of the receiving resistor to a relatively higher voltage level than a voltage of the other end of the receiving resistor;
a second amplifier for amplifying the voltage of the one end of the receiving resistor to a same voltage level as the voltage of the other end of the receiving resistor; and
a third amplifier for amplifying the voltage of the other end of the receiving resistor to a same voltage level as the voltage of the one end of the receiving resistor.

17. The interface system according to claim 16, wherein the first amplifier is configured to amplify the voltage of the one end so that the voltage of the one end has a higher voltage value than the voltage of the other end when a voltage corresponding to "10" bits is applied to the receiving resistor.

18. The interface system according to claim 16, wherein the third amplifier is configured to amplify the voltage of the other end so that the voltage of the other end has a higher voltage value than the voltage of the one end when a voltage corresponding to "01" bits is applied to the receiving resistor.

19. The interface system according to claim 16, wherein each of the comparators is configured to generate a bit of "0" when the voltage of the one end out of the voltages supplied from each of the amplifiers has a higher voltage value than the voltage of the other end, and to generate a bit of "1" when the voltage of the one end out of the voltages supplied from each of the amplifiers has a lower voltage value than the voltage of the other end.

20. The interface system according to claim 15, wherein the encoders are configured to generate 2 bits of "00" when 3 bits of "000" are inputted from the comparators, to generate 2 bits of "01" when 3 bits of "001" are inputted from the comparators, to generate 2 bits of "10" when 3 bits of "011" are inputted from the comparators, and to generate 2 bits of "11" when 3 bits of "111" are inputted from the comparators.

21. The interface system according to claim 15, wherein the deserializing unit comprises:
a first deserializer for sequentially receiving bits of the first data from the encoder; and
a second deserializer for sequentially receiving bits of the second data from the encoder.

22. The interface system according to claim 21, wherein each of the first deserializer and the second deserializer comprises:
first flip-flops for receiving the first data or the second data and sequentially storing the received data; and
second flip-flops for receiving the stored bits of the first flip-flops and concurrently outputting the received bits of the first flip-flops when all bits of the first data or the second data are stored in the first flip-flops.

23. The interface system according to claim 22, wherein the first flip-flops and the second flip-flops comprise D flip-flops.

24. The interface system according to claim 15, wherein at least one of the transmission resistor or the receiving resistor comprises:
a main resistor between the transmission/receiving lines;
a plurality of auxiliary resistors coupled in parallel with the main resistor; and
switches coupled with respective said auxiliary resistors, the switches for controlling an electrical connection of the transmission/receiving lines with the auxiliary resistors.

25. A flat panel display comprising:
a timing controller for receiving data from an external system;
a data driver for generating data signals using the data supplied from the timing controller and supplying the generated data signals to data lines;
a scan driver for sequentially supplying a scan signal to scan lines;
pixels at crossings between the scan lines and the data lines and for generating light having a luminance corresponding to the data signals; and
an interface system for transmitting the data between the external system and the timing controller,
wherein the interface system comprises:
a serializing unit for receiving first data and second data and sequentially outputting bits of the received first data and bits of the second data as 2 bits;
a transmission circuit for generating 4 voltage levels corresponding to the 2 bits supplied from the serializing unit;
a receiving circuit for recovering the 2 bits using the voltage levels supplied from the transmission circuit; and
a deserializing unit for recovering the first data and the second data while sequentially storing the 2 bits supplied from the receiving circuit,
wherein a bit of the 2 bits comprises one of the bits of the first data, and an other bit of the 2 bits comprises one of the bits of the second data.

26. The flat panel display according to claim 25, wherein the transmission circuit comprises:
a decoder for converting the 2 bits to 3 bits;
a driver for controlling a flow of electric currents in accordance with the 3 bits; and
a transmission resistor for applying a voltage corresponding to the flow of electric currents supplied from the driver.

27. The flat panel display according to claim 26, wherein the decoder is configured to generate 3 bits of "000" when 2 bits of "00" are inputted, to generate 3 bits of "001" when 2 bits of "01" are inputted, to generate 3 bits of "011" when 2 bits of "10" are inputted, and to generate 3 bits of "111" when 2 bits of "11" are inputted.

28. The flat panel display according to claim 27, wherein the driver comprises 3 drive circuits for receiving different bits of the 3 bits and for controlling the flow of electric currents in accordance with the received bits.

29. The flat panel display according to claim 28, wherein each of the drive circuits comprises:
a first transistor coupled with a first voltage and for controlling a channel width so that a constant electric current flows from the first voltage;
a second transistor coupled with a second voltage and for controlling a channel width so that the constant electric current flows to the second voltage;
a third transistor and a fourth transistor between the first transistor and the second transistor; and
a fifth transistor and a sixth transistor coupled in parallel with the third transistor and the fourth transistor.

30. The flat panel display according to claim 29, wherein the first voltage is higher than the second voltage.

31. The flat panel display according to claim 29, wherein the third transistor and the fourth transistor are turned on and turned off by certain bits of the 3 bits, and
wherein the fifth transistor and the sixth transistor are turned on and turned off by inverted bits of the certain bits.

32. The flat panel display according to claim 31, wherein the third transistor and the fifth transistor are PMOS transistors, and the fourth transistor and the sixth transistor are NMOS transistors.

33. The flat panel display according to claim 32, wherein the drive circuits are configured to control a direction of an electric current flowing in the transmission resistor between transmission/receiving lines in accordance with the 3 bits.

34. The flat panel display according to claim 33, wherein the receiving circuit comprises:
a receiving resistor between the transmission/receiving lines to receive a voltage applied to the transmission resistor;
amplifiers for amplifying the voltage applied to the receiving resistor;
comparators coupled to the amplifiers, the comparators for comparing voltages supplied from the amplifiers; and
an encoder for recovering the 2 bits using bits supplied from the comparators.

35. The flat panel display according to claim 34, wherein the amplifiers comprise:
- a first amplifier for amplifying a voltage of one end of the receiving resistor to a relatively higher voltage level than a voltage of the other end of the receiving resistor;
- a second amplifier for amplifying the voltage of the one end of the receiving resistor to a same voltage level as the voltage of the other end of the receiving resistor; and
- a third amplifier for amplifying the voltage of the other end of the receiving resistor to a same voltage level as the voltage of the one end of the receiving resistor.

36. The flat panel display according to claim 35, wherein the first amplifier is configured to amplify the voltage of the one end so that the voltage of the one end has a higher voltage value than the voltage of the other end when a voltage corresponding to "10" bits is applied to the receiving resistor.

37. The flat panel display according to claim 35, wherein the third amplifier is configured to amplify the voltage of the other end so that the voltage of the other end has a higher voltage value than the voltage of the one end when a voltage corresponding to "01" bits is applied to the receiving resistor.

38. The flat panel display according to claim 35, wherein each of the comparators is configured to generate a bit of "0" when the voltage of the one end out of the voltages supplied from each of the amplifiers has a higher voltage value than the voltage of the other end, and to generate a bit of "1" when the voltage of the one end has a lower voltage value than the voltage of the other end.

39. The flat panel display according to claim 34, wherein the encoders are configured to generate 2 bits of "00" when 3 bits of "000" are inputted from the comparators, to generate 2 bits of "01" when 3 bits of "001" are inputted from the comparators, to generate 2 bits of "10" when 3 bits of "011" are inputted from the comparators, and to generate 2 bits of "11" when 3 bits of "111" are inputted from the comparators.

40. The flat panel display according to claim 34, wherein at least one of the transmission resistor or the receiving resistor comprises:
- a main resistor between the transmission/receiving lines;
- a plurality of auxiliary resistors coupled in parallel with the main resistor; and
- switches coupled with respective said auxiliary resistors, the switches for controlling an electrical connection of the transmission/receiving lines with the auxiliary resistors.

* * * * *